(12) United States Patent
Koyama et al.

(10) Patent No.: US 11,656,834 B2
(45) Date of Patent: May 23, 2023

(54) INFORMATION PROCESSING DEVICE, NON-TRANSITORY RECORDING MEDIUM, AND INFORMATION PROCESSING SYSTEM

(71) Applicants: Takeshi Koyama, Saitama (JP); Tatsuroh Sugioka, Kanagawa (JP); Atsushi Takagi, Kanagawa (JP)

(72) Inventors: Takeshi Koyama, Saitama (JP); Tatsuroh Sugioka, Kanagawa (JP); Atsushi Takagi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/395,464

(22) Filed: Aug. 6, 2021

(65) Prior Publication Data

US 2022/0083306 A1 Mar. 17, 2022

(30) Foreign Application Priority Data

Sep. 16, 2020 (JP) .............................. JP2020-155883

(51) Int. Cl.
*G06F 3/14* (2006.01)
*H04L 65/1089* (2022.01)
*H04L 65/1069* (2022.01)
*H04L 12/12* (2006.01)

(52) U.S. Cl.
CPC ............ *G06F 3/1454* (2013.01); *H04L 12/12* (2013.01); *H04L 65/1069* (2013.01); *H04L 65/1089* (2013.01)

(58) Field of Classification Search
CPC ......... G06F 3/14; G06F 3/1454; G06F 3/1462
See application file for complete search history.

(56) References Cited

U.S. PATENT DOCUMENTS

| 2003/0212811 | A1* | 11/2003 | Thornton | G09G 5/001 709/231 |
|---|---|---|---|---|
| 2005/0078940 | A1 | 4/2005 | Wakita et al. | |
| 2008/0021730 | A1* | 1/2008 | Holla | G16H 10/60 705/2 |
| 2012/0072895 | A1 | 3/2012 | Koyama et al. | |
| 2013/0054467 | A1* | 2/2013 | Dala | G06F 21/6245 705/51 |

(Continued)

FOREIGN PATENT DOCUMENTS

| JP | 2008-234072 | 10/2008 |
|---|---|---|
| JP | 2016033837 | 3/2016 |

OTHER PUBLICATIONS

U.S. Appl. No. 16/935,211, filed Jul. 22, 2020, Yuichi Kawasaki, et al.

Primary Examiner — Michael J Eurice
(74) Attorney, Agent, or Firm — Xsensus LLP

(57) ABSTRACT

An information processing device includes circuitry to detect one of a device and an information processing terminal. The device is connected to the information processing terminal and used to receive an output image of the information processing terminal. The information processing terminal is connected to the information processing device via the device. The circuitry causes a display device connected to the information processing device to display the output image of the information processing terminal, according to a detection of the one of the device and the information processing terminal.

18 Claims, 16 Drawing Sheets

(56) References Cited

U.S. PATENT DOCUMENTS

| | | | |
|---|---|---|---|
| 2013/0328878 A1* | 12/2013 | Stahl | G09G 5/005 |
| | | | 345/1.3 |
| 2015/0035938 A1* | 2/2015 | Emori | H04L 12/1827 |
| | | | 348/14.08 |
| 2015/0264315 A1* | 9/2015 | Kitazawa | H04N 7/15 |
| | | | 348/14.08 |
| 2015/0309765 A1* | 10/2015 | Nagahara | H04M 3/567 |
| | | | 345/2.2 |
| 2015/0371682 A1 | 12/2015 | Aoki et al. | |
| 2016/0044187 A1* | 2/2016 | Hamada | G06V 20/00 |
| | | | 358/1.15 |
| 2018/0011679 A1 | 1/2018 | Sugioka | |
| 2018/0095711 A1* | 4/2018 | Kanda | H04L 65/403 |
| 2018/0232138 A1 | 8/2018 | Kanematsu et al. | |
| 2018/0234295 A1 | 8/2018 | Koyama et al. | |
| 2020/0213557 A1* | 7/2020 | Jeong | H04N 21/42209 |
| 2021/0105307 A1 | 4/2021 | Oyama et al. | |
| 2021/0126955 A1 | 4/2021 | Nagaoka et al. | |

* cited by examiner

FIG. 8

| CAPTURE DEVICE NAME | VENDOR ID | PRODUCT ID |
|---|---|---|
| AAA | 054B | 23A4 |
| BBB | 054C | 24A1 |

INFORMATION PROCESSING DEVICE, NON-TRANSITORY RECORDING MEDIUM, AND INFORMATION PROCESSING SYSTEM

CROSS-REFERENCE TO RELATED APPLICATION

This patent application is based on and claims priority pursuant to 35 U.S.C. § 119(a) to Japanese Patent Application No. 2020-155883, filed on Sep. 16, 2020, in the Japan Patent Office, the entire disclosure of which is hereby incorporated by reference.

BACKGROUND

Technical Field

Embodiments of the present disclosure relate to an information processing device, a non-transitory recording medium, and an information processing system.

Related Art

In recent years, a web conference system in which a plurality of client terminals and a server are connected via a network, and a plurality of users each uses corresponding one of the plurality of client terminals exchange, or share, information in real time is in widespread use. Such a conventional web conference system has an application sharing function with which a user using a corresponding one of the plurality of client terminals provides to, or shares with, the other users, an application executing in the corresponding client terminal via a network.

SUMMARY

An exemplary embodiment of the present disclosure includes an information processing device including circuitry to detect one of a device and an information processing terminal. The device is connected to the information processing terminal and used to receive an output image of the information processing terminal. The information processing terminal is connected to the information processing device via the device. The circuitry causes a display device connected to the information processing device to display the output image of the information processing terminal, according to a detection of the one of the device and the information processing terminal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a configuration diagram of an example of target device information according to one or more embodiments of the present disclosure;

Figure 1:
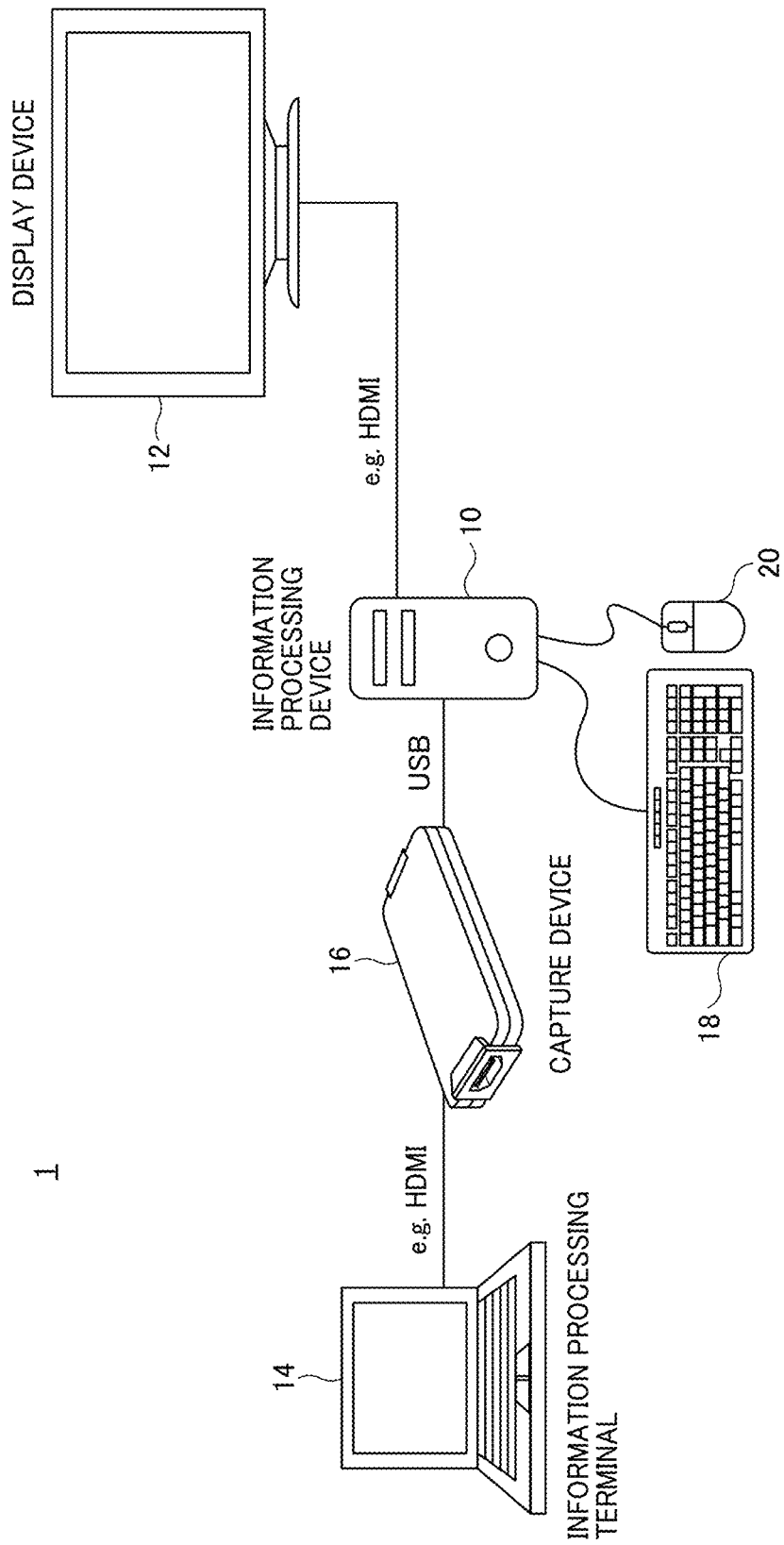
FIG. 1 is a schematic diagram illustrating an example of a configuration of an information processing system according to one or more embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described below with reference to the attached drawings. In the description given hereinafter, an information processing system for a video conference (video meeting) is used as an example. However, this is not limiting the disclosure, and embodiments of the disclosure are applicable to various kinds of information processing system for example, for seminar, lecture, class or the like, in which screen sharing is performed.

First Embodiment

System Configuration:

FIG. 1 is a schematic diagram illustrating a configuration of an information processing system according to a first embodiment. The information processing system 1 illustrated in FIG. 1 includes an information processing device 10, a display device 12, an information processing terminal 14, a capture device 16, a keyboard 18, and a mouse 20.

The information processing device 10 is a shared terminal set in a room such as a conference room (meeting room). The information processing device 10 is, for example, a personal computer (PC). The information processing device 10 controls a screen to be displayed on the display device 12, such as an external display, via a High-Definition Multimedia Interface (HDMI) (registered trademark) or the like, which is an example of a communication standard. Each of the keyboard 18 and the mouse 20 is an examples of an input device that receives various user operations, such as selection operations, with respect to the information processing device 10. The information processing device 10 receives various user operations via the keyboard 18 and the mouse 20.

The information processing device 10 connects to the capture device 16 via a Universal Serial Bus (USB), which is an example of a bus standard for connecting peripheral devices to a computer. The connection of the capture device 16 means that the capture device 16 is connected by using a USB so as to perform wired or wireless communication. The capture device 16 is an example of hardware that acquires an image based on a video signal output via the HDMI and outputs the image, for example. Hereinafter, processing of acquiring an image based on a video signal output via the HDMI performed by the capture device 16 may be referred to as "capturing". An information processing device 10 detects a connection of the capture device 16 in a manner that the capture device 16 is detected as a device that is used to receive an output image of an information processing terminal 14.

In some embodiments, the capture device 16 may be connected to the information processing device 10 in advance, and in this case, when the information processing terminal 14 is connected to the capture device 16, the capture device 16 receives an output image of the information processing terminal 14. In some embodiments, the capture device 16 may be connected to the information processing device 10 together with the information processing terminal 14 when screen sharing is performed. In the following description of embodiments, a configuration in which a connection of the capture device 16 is detected is given, but this is not limiting the disclosure. In alternative to detecting the connection of the capture device 16, a connection of the information processing terminal 14 may be detected, and then a screen sharing may be performed.

The information processing terminal 14 is, for example, a personal terminal of a user who attends a conference (meeting). The information processing device 10 is, for example, a PC. The information processing terminal 14 is connected to the capture device 16 via an HDMI or the like, which is an example of a communication standard. The information processing terminal 14 is an example of a target for screen sharing, that is, a screen of the information processing terminal 14 is to be shared by using the display device 12. The target for screen sharing may be referred to as a screen sharing target, hereinafter.

For example, in the information processing system 1 illustrated FIG. 1, a screen displayed on the information processing terminal 14 is captured by the capture device 16 and is transmitted to the information processing device 10 as an output image of the information processing terminal 14. The information processing device 10 causes the display device 12 to display the received output image of the information processing terminal 14, thereby performing screen sharing between users attending a conference.

The configuration of the information processing system 1 illustrated in FIG. 1 is an example. The information processing device 10 is not limited to a PC. The information processing device 10 includes, for example, a projector (PJ), an Interactive White Board (IWB), which is an electronical whiteboard with mutual communication capability, an output device such as a digital signage, a Head-Up Display (HUD) device, an industrial machine, an imaging device, a sound collecting device, a medical device, a networked home appliance, and a connected car. The information processing device 10 may be a mobile phone, a smartphone, a tablet terminal, a game machine, a Personal Digital Assistant (PDA), a digital camera, or the like. The information processing terminal 14 is not limited to a PC. The information processing terminal 14 may be a mobile phone, a smartphone, a tablet terminal, a game machine, a PDA, a digital camera, or the like.

Figure 2:
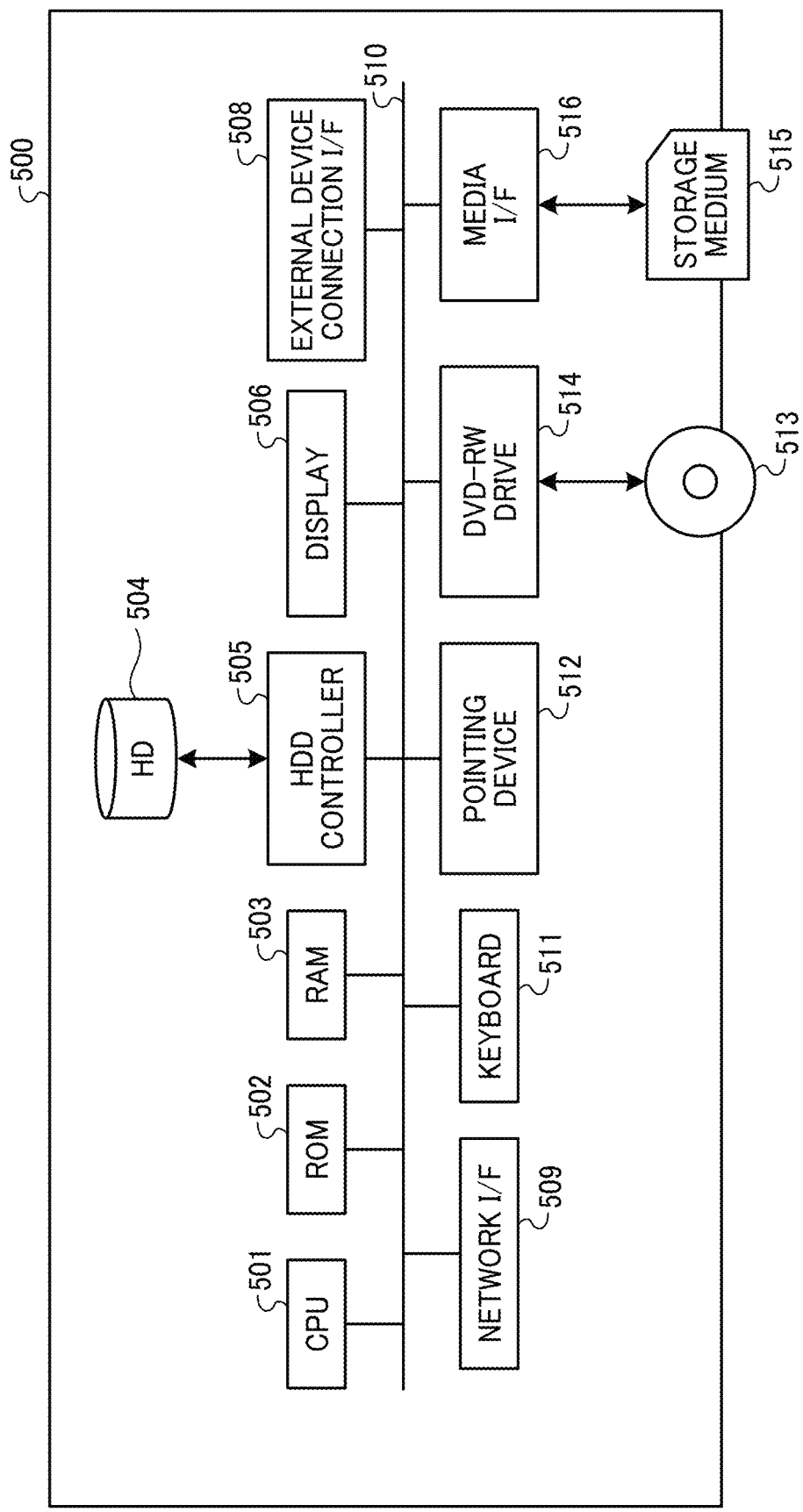
FIG. 2 is a block diagram illustrating an example of a hardware configuration of a computer according to one or more embodiments of the present disclosure.

Hardware Configuration:

Hardware Configuration of Computer:

Each of the information processing device 10 and the information processing terminal 14 illustrated in FIG. 1 is implemented by, for example, a computer 500 having a hardware configuration illustrated in FIG. 2. FIG. 2 is a block diagram illustrating an example of a hardware configuration of a computer according to the present embodiment.

The computer 500 includes a Central Processing Unit (CPU) 501, a Read Only Memory (ROM) 502, a Random Access Memory (RAM) 503, a Hard Disk (HD) 504, a Hard Disk Drive (HDD) controller 505, a display 506, an external device connection interface (I/F) 508, a network I/F 509, a data bus 510, a keyboard 511, a pointing device 512, a Digital Versatile Disk Rewritable (DVD-RW) drive 514, and a media I/F 516.

The CPU 501 is a processor that performs overall control of the computer 500 according to a program. The ROM 502 stores a program such as an Initial Program Loader (IPL) used for driving the CPU 501. The RAM 503 is a work area in the CPU 501. The HD 504 stores various data such as a program. The HDD controller 505 reads or writes various data from or to the HD 504 under control of the CPU 501.

The display 506 displays various information such as a cursor, a menu, a window, a character, or an image. The external device connection I/F 508 is an interface for connecting various external devices. As an example of the external device in this case, a USB memory may be used. The network I/F 509 is an interface for performing data communication using a communication network. Examples of the data bus 510 include, but not limited to, an address bus and a data bus, which electrically connects the components, such as the CPU 501, with one another.

The keyboard 511 is one example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a Digital Versatile Disc-Recordable (DVD-R) or the like. The media I/F 516 controls the storage medium 515 such as a flash memory that reads or writes (stores) data.

In the case of the computer 500, which implements the information processing device 10, illustrated in FIG. 1, the keyboard 511 corresponds to the keyboard 18 illustrated in FIG. 1. The pointing device 512 corresponds to the mouse 20 illustrated in FIG. 1. The display 506 corresponds to the display device 12 illustrated in FIG. 1.

Figure 3:
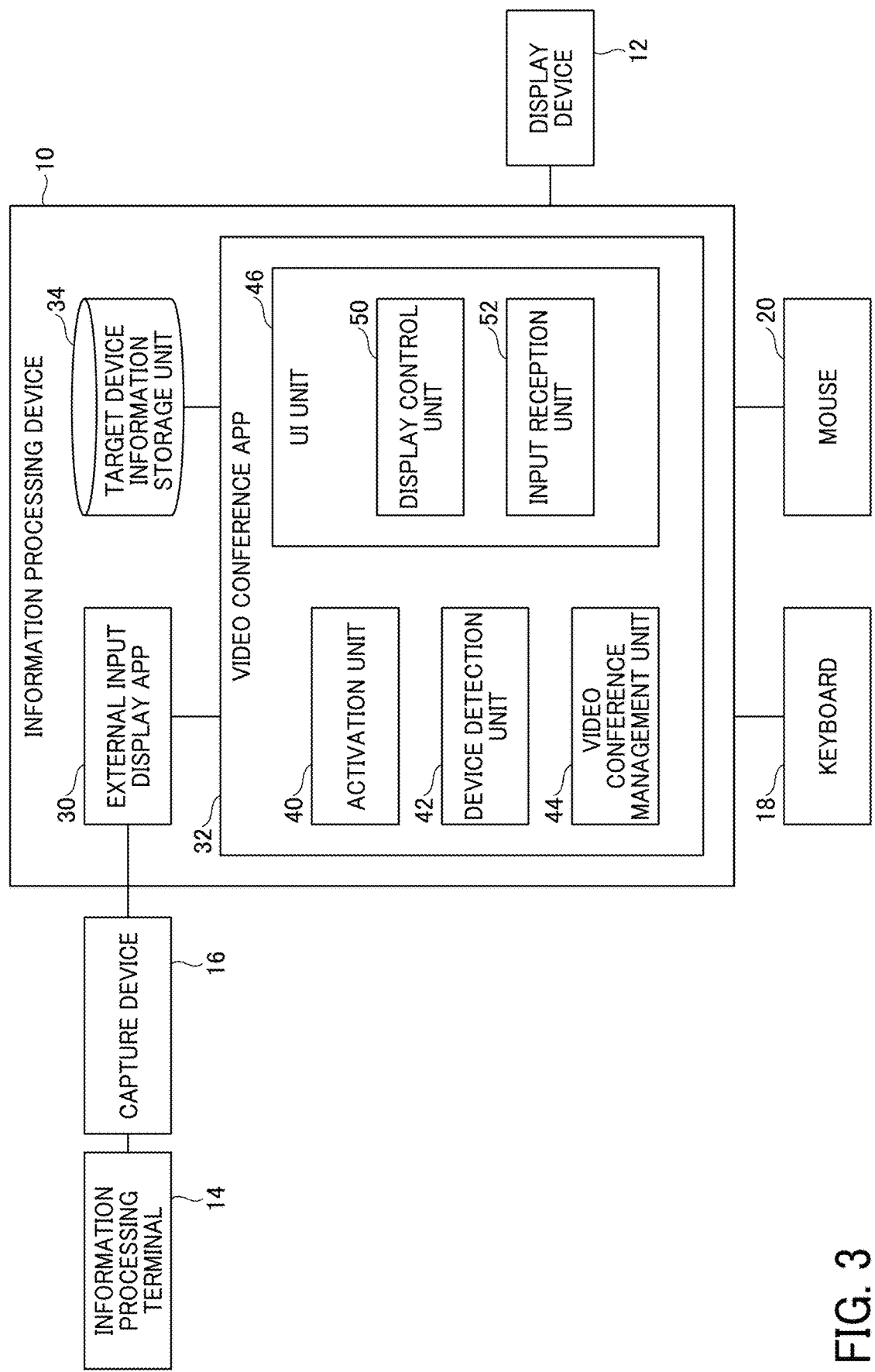
FIG. 3 is a block diagram illustrating an example of a functional configuration of an information processing device according to one or more embodiments of the present disclosure.

Functional Configuration:

The information processing device 10 of the information processing system 1 according to the present embodiment is implemented by a functional configuration as illustrated in FIG. 3, for example. FIG. 3 is a block diagram illustrating an example of a functional configuration of the information processing device 10 according to the present embodiment. Components unnecessary for describing the present embodiment are not illustrated in the functional configuration illustrated in FIG. 3.

The information processing device 10 illustrated in FIG. 3 is installed with an external input display application (external input display app) 30 and a video conference application (video conference app) 32 to be executed. The information processing device 10 further includes a target device information storage unit 34.

The external input display application 30 is, for example, a viewer application, and performs processing for displaying on the display device 12 an output image of the information processing terminal 14 received via the capture device 16. The video conference application 32 has a video conference function. By executing the video conference application 32, the information processing device 10 implements an activation unit 40, a device detection unit 42, a video conference management unit 44, and a User Interface (UI) unit 46. The UI unit 46 includes a display control unit 50 and an input reception unit 52.

The activation unit 40 activates the external input display application 30 when the capture device 16 is detected, as described later, or when a selection operation that is a user operation performed by a user for displaying an output image of the information processing terminal 14 on the display device 12 is received, as described later.

The device detection unit 42 detects a connection or a disconnection of the capture device 16 by a USB insertion event, which is inserting a USB, or a USB removal event, which is removing a USB, and notifies the activation unit 40 of the detection. The video conference management unit 44 manages a video conference.

The UI unit 46 controls a user interface. The display control unit 50 of the UI unit 46 causes the display device 12 to display a screen of the external input display application 30 or a conference screen of the video conference application 32. The display device 12 includes a display unit that displays a screen such as a screen of the external input display application 30 or a conference screen of the video conference application 32 under control of the display control unit 50. The input reception unit 52 receives various user operations including selection operations performed by a user with respect to a screen displayed on the display device 12. The target device information storage unit 34 stores target device information, which is described later. The information processing device 10 illustrated in FIG. 3 implements the functional configuration as illustrated in FIG. 3 by executing a program.

Figure 4:
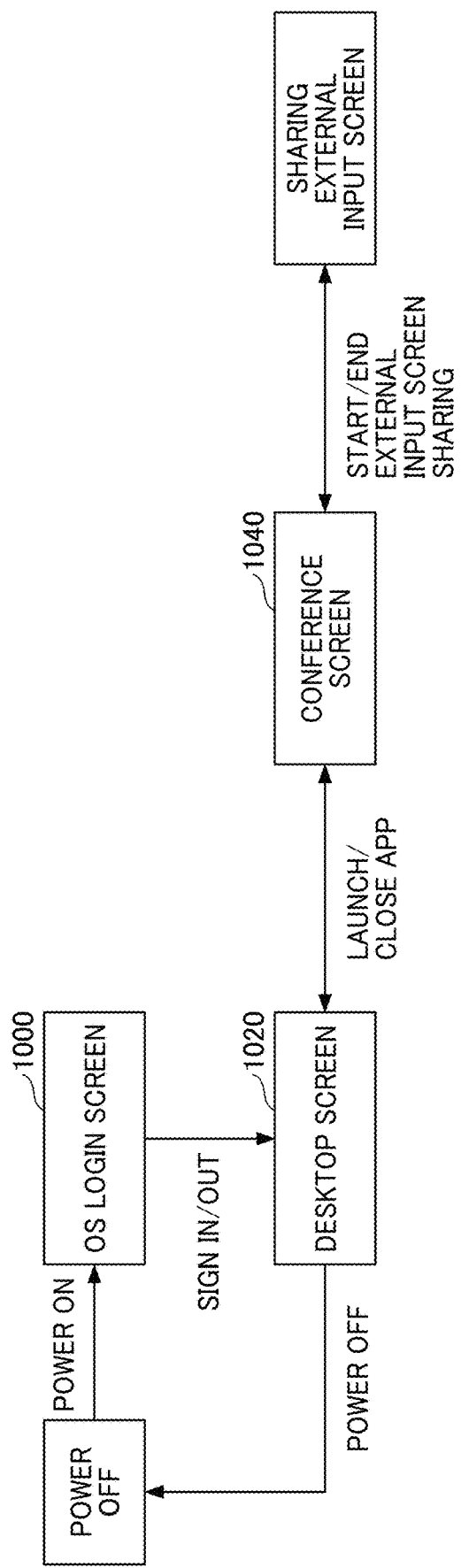
FIG. 4 is a schematic diagram illustrating an example of screen transition in an information processing system according to one or more embodiments of the present disclosure.

Screen Transition:

FIG. 4 is a schematic diagram illustrating an example of screen transition in the information processing system according to the present embodiment. A screen displayed on the display device 12 by the information processing device 10 transitions as illustrated in FIG. 4, for example. The information processing device 10 displays a login screen 1000 of an operating system (OS) on the display device 12 when the power is turned on. The information processing device 10 displays a desktop screen 1020 on the display device 12 by sign-in performed by the user. The information processing device 10 displays, for example, a conference screen 1040 as illustrated in FIG. 5 on the display device 12 when the user launches the video conference application 32.

Figure 5:
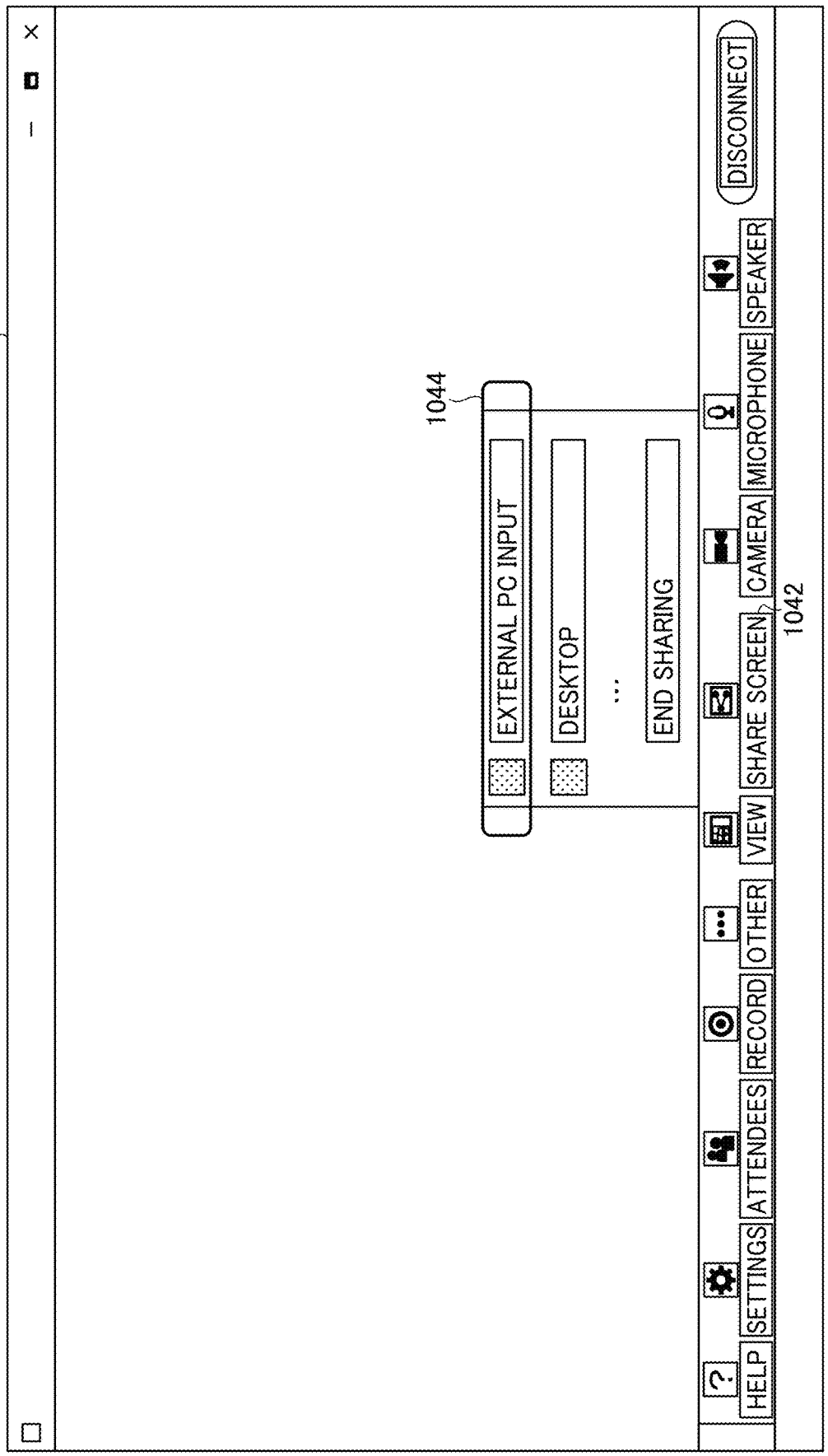
FIG. 5 is an illustration of an example of a conference screen according to one or more embodiments of the present disclosure.

FIG. 5 is an illustration of an example of a conference screen according to the present embodiment. The conference screen 1040 illustrated in FIG. 5 has a screen sharing button ("SHARE SCREEN") 1042 at the bottom of the screen. In response to a user operation of a user who operates (uses) the information processing device 10 of pressing the screen sharing button 1042, a screen sharing target list is displayed on the conference screen 1040. The screen sharing target list is a list for selecting a target for screen sharing (screen sharing target). The screen sharing target list illustrated in FIG. 5 includes an external PC input 1044 used for selecting an external input screen as one of the screen sharing targets. In response to a user operation of selecting the external PC input 1044, start of screen sharing of external input screen is requested. A request for start of screen sharing of external input screen may be referred to as an external input screen sharing start request, or a screen sharing request.

In response to the external input screen sharing request, the information processing device 10 activates the external input display application 30, displays an output image of the information processing terminal 14, which is an example of the external input screen, on the display device 12, and starts screen sharing (starts sharing a screen). When the capture device 16 is detected, the information processing device 10 activates the external input display application 30, displays an output image of the information processing terminal 14, which is an example of an external input screen, on the display device 12, and starts screen sharing.

In the example of the screen transition illustrated in FIG. 4, sharing a screen of the output image of the information processing terminal 14, which is an example of the external input screen, ends in response to an occurrence of an event for terminating the external input screen sharing. The information processing device 10 displays the desktop screen 1020 on the display device 12 when the user closes the video conference application 32. When the user signs out, the information processing device 10 displays the login screen 1000 on the display device 12.

Figure 6:
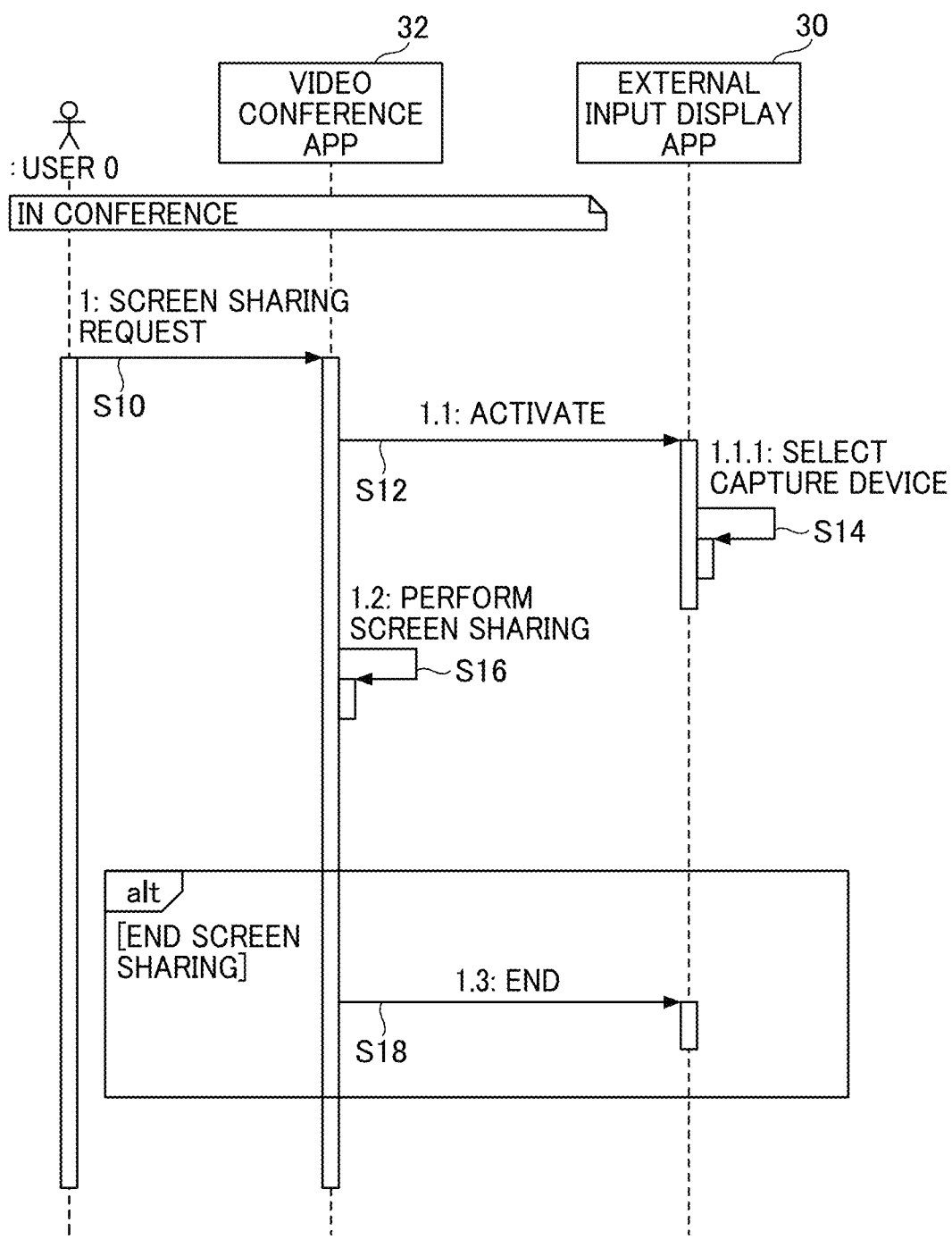
FIG. 6 is a sequence diagram illustrating an example of a screen sharing process in an information processing system according to one or more embodiments of the present disclosure.

Process:

FIG. 6 is a sequence diagram illustrating an example of a process of performing screen sharing (sharing a screen) in the information processing system according to the present embodiment. The process may be referred to as a screen sharing process, hereinafter. In FIG. 6, the screen sharing process in which an output image of the information processing terminal 14 is shared starts in response to a user operation of selecting the external PC input 1044 on the conference screen 1040 illustrated in FIG. 5.

In step S10, a user who operates (uses) the information processing device 10 selects the external PC input 1044 on the conference screen 1040 to request the information processing device 10 to start sharing an external input screen.

In response to receiving the request for start sharing the external input screen (external input screen sharing start request/screen sharing start request), the activation unit 40 of the video conference application 32 activates the external input display application 30 in step S12. In step S14, the external input display application 30 selects the capture device 16 from among the peripheral devices connected via USBs or the like. In step S16, after confirming the activation of the external input display application 30, the display control unit 50 of the video conference application 32 causes the display device 12 to display an output image of the information processing terminal 14, thereby starting screen sharing. In response to an occurrence of an event to end the external input screen sharing, such as receiving an external input screen sharing end request from the user, the activation unit 40 of the video conference application 32 ends the external input display application 30 in step S18.

Figure 7:
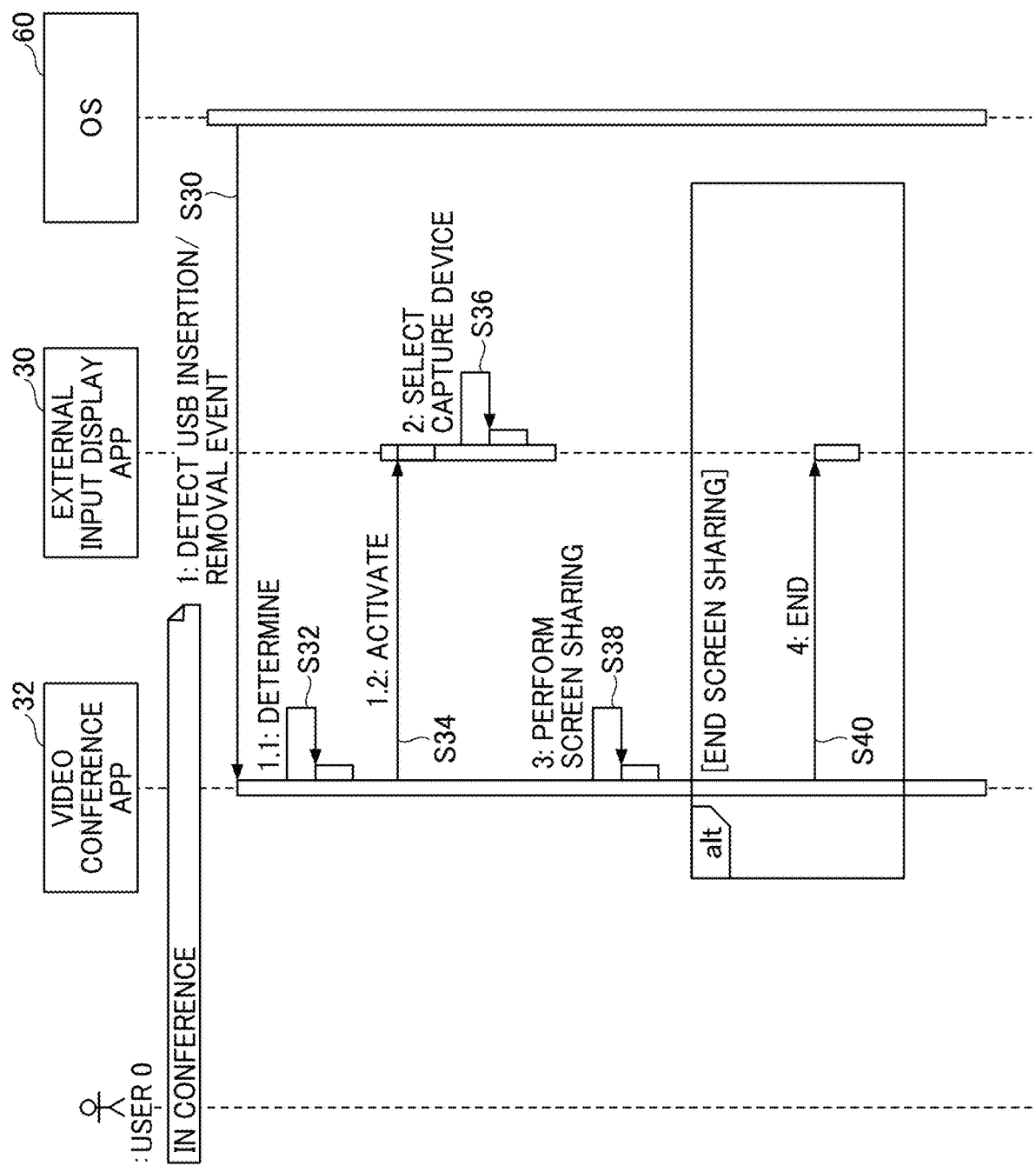
FIG. 7 is a sequence diagram illustrating an example of a screen sharing process in an information processing system according to one or more embodiments of the present disclosure.

FIG. 7 is a sequence diagram illustrating an example of a screen sharing process in the information processing system according to the present embodiment. In FIG. 7, the screen sharing process in which an output image of the information processing terminal 14 is shared starts when the video conference application 32 detects a connection of the capture device 16.

In the conference (meeting), the user connects the capture device 16 to the information processing device 10 via a USB or the like. In step S30, an OS 60 of the information processing device 10 notifies the device detection unit 42 of the video conference application 32 of a USB insertion/removal event indicating that a USB has been inserted.

In step S32, the device detection unit 42 determines whether a connected device, which is the capture device 16, is the capture devices 16 that is a screen sharing target. In a determination processing of step S32, whether the capture device 16 is a screen sharing target is determined based on target device information illustrated in FIG. 8 stored in the target device information storage unit 34.

FIG. 8 is a configuration diagram of an example of target device information. The target device information illustrated in FIG. 8 includes information related to the capture device 16 that is a screen sharing target. The target device information illustrated in FIG. 8 includes data items of capture device name, vendor identification/identifier (ID), and product ID.

The capture device name is a name of the capture device 16 that is a screen sharing target. The vendor ID indicates an identifier of a manufacturer of the capture device 16. The product ID indicates an identifier of the capture device 16. As described above, the capture device 16 described in the target device information illustrated FIG. 8 is a target for screen sharing (screen sharing target).

The device detection unit 42 checks a vendor ID and a product ID of the capture device 16 whose connection has been detected and refers the vendor IDs and the product IDs stored in the target device information illustrated in FIG. 8 to determine whether the capture device 16 is a screen sharing target. When the capture device 16 is a screen sharing target, the device detection unit 42 activates the external input display application 30 in step S34.

When the capture device 16 is not a screen sharing target, the device detection unit 42 does not activate the external input display application 30. As described above, the device detection unit 42 activates the external input display application 30 when detecting the connection of the capture device 16 that is a screen sharing target.

In step S36, the external input display application 30 selects the capture device 16 that is a screen sharing target. In step S38, after confirming that the external input display application 30 is activated, the display control unit 50 of the video conference application 32 causes the display device 12 to display an output image of the information processing terminal 14, thereby starting screen sharing. In step S40, the activation unit 40 of the video conference application 32 ends the external input display application 30 in response to an occurrence of an external input screen sharing end event such as notification of a USB insertion/removal event indicating that the USB has been removed. In step S30, the OS 60 of the information processing device 10 notifies the device detection unit 42 of the video conference application 32 of a USB insertion/removal event indicating that a USB has been inserted. However, there is a case in which the capture device 16 is connected to the information processing terminal 14 in advance, and in such a case, the OS 60 of the information processing device 10 notifies the device detection unit 42 of the video conference application 32 of a connection/disconnection event of the information processing terminal 14. In this case, at a stage where the capture device 16 is connected to the information processing device 10, step S36 in which the capture device 16, which is a screen sharing target, is selected is performed. After that, the information processing terminal 14 is connected to the capture device 16 via an HDMI or the like. When detecting a HDMI connection (video input) from the information processing terminal 14, the capture device 16 notifies the device detection unit 42 of the video conference application 32 of the detection. When the notification is received, in step S38, screen sharing is started by causing the display device 12 to display the output image of the information processing terminal 14.

According to the above-described embodiment, the information processing terminal 14 operated (used) by a user is connected to a shared terminal (information processing device 10) set (placed) in a conference room (meeting room), and a screen of the information processing terminal 14 is displayed on an external display set (placed) in the same conference room so as to be shared between the attendees of a conference. According to the present embodiment, time and effort for sharing the screen of the information processing terminal 14 connected to the information processing device 10 are reduced. In addition, the external input display application 30 for performing screen sharing of output image of the information processing terminal 14 is prepared, and the external input display application 30 can be automatically activated. According to the present embodiment, time and effort for sharing the screen of the information processing terminal 14 using the external input display application 30.

Second Embodiment

Figure 9:
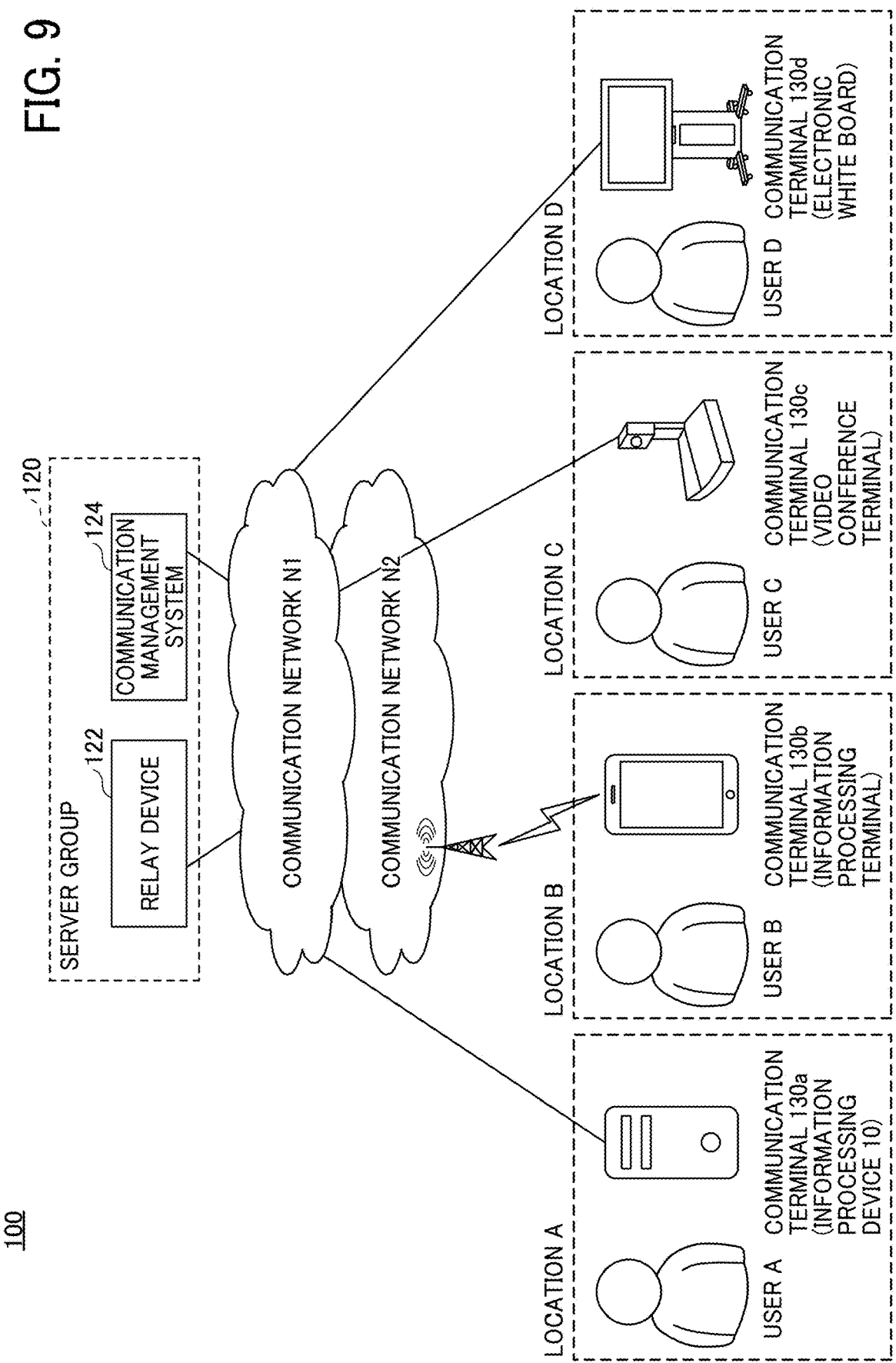
FIG. 9 is a schematic diagram illustrating an example of a configuration of an information processing system according to one or more embodiments of the present disclosure.

The screen sharing of the output image of the information processing terminal 14 described as the first embodiment is performable between a plurality of locations (bases). This is described as a second embodiment below. FIG. 9 is a schematic diagram illustrating an example of a configuration of an information processing system according to the second embodiment.

For example, an information processing system 100 is a system for performing a video conference by bidirectional communication (two-way communication) of images and sounds between a plurality of communication terminals 130a to 130d. Irrespective of a type of conference (what is discussed in a conference), the information processing system 100 is applicable.

As illustrated in FIG. 9, the information processing system 100 includes a relay device 122, a communication management system 124 and the plurality of communication terminals 130a to 130d. The relay device 122 and the communication management system 124 are also collectively referred to as a server group 120.

In the example illustrated in FIG. 9, the communication terminal 130a, the communication terminal 130b, the communication terminal 130c, and the communication terminal 130d participate in a video conference. The communication terminal 130a is the information processing device 10 placed at a location A and operated (used) by a user A. The communication terminal 130b is an information processing terminal placed at a location B and operated by a user B. The communication terminal 130c is a video conference terminal placed at a location C and operated by a user C. The communication terminal 130d is an electronic whiteboard placed at a location D and operated by a user D.

The communication terminals 130a, 130b, 130c, and 130d are connected to the server group 120 via one of communication networks N1 and N2. Each of the communication networks N1 and N2 includes, for example, a wireless communication part. The communication network N1 includes, for example, the Internet. The communication network N2 includes, for example, a base station and mobile communications network. By using the communication network N1 or N2, the communication terminals 130a, 130b, 130c, and 130d and the server group 120 communicates with each other.

The devices, apparatuses, or terminals described in the present embodiment are merely one example of a plurality of computing environments each for implementing an embodiment of the disclosure. For example, in some embodiments, the relay device 122 and the communication management system 124 include a plurality of computing devices, such as a server cluster. The plurality of computing devices communicate with one another through any type of communication link including a network, shared memory, etc., and performs a process described in the embodiment.

Figure 10:
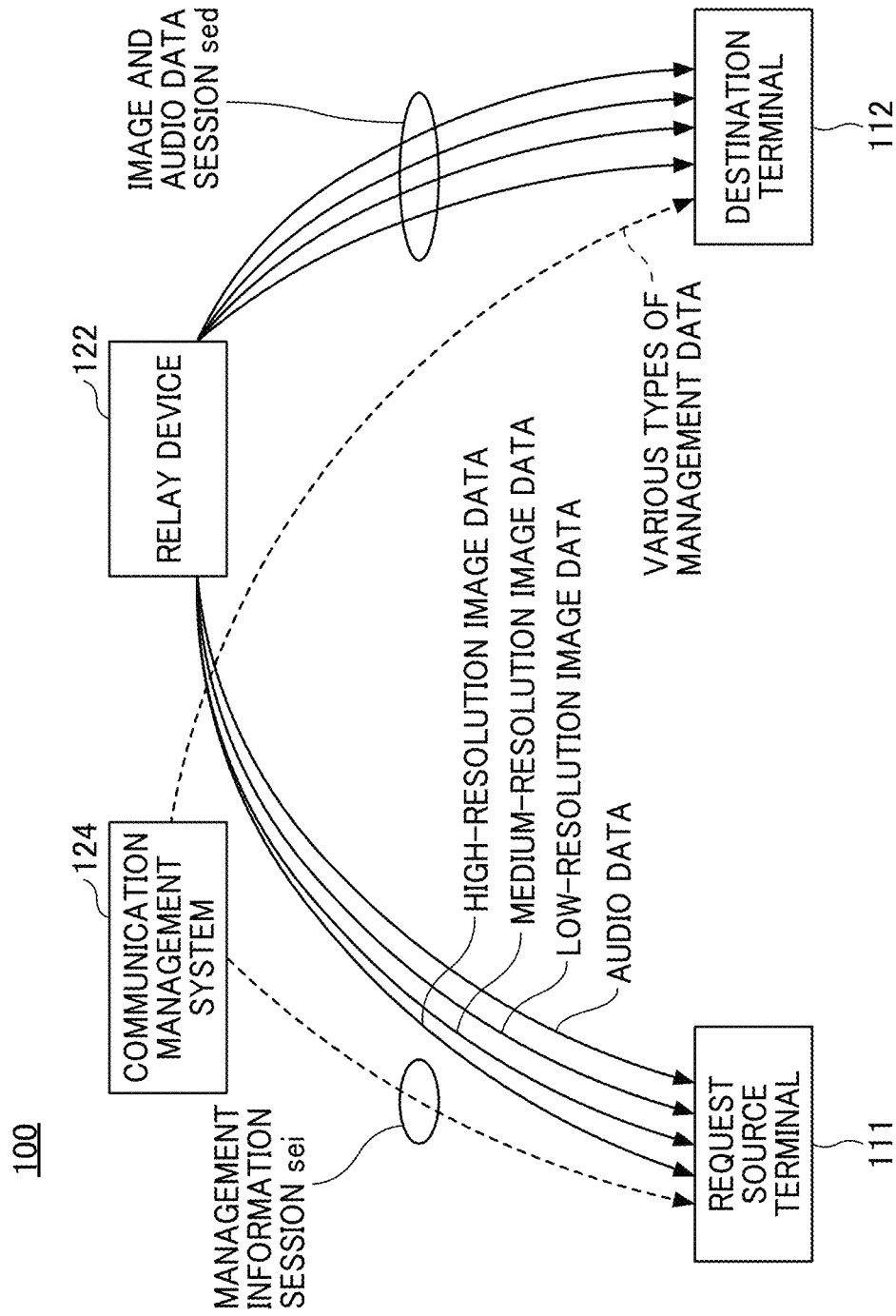
FIG. 10 is a diagram illustrating how a communication in a video conference is established, according to one or more embodiments of the present disclosure.

FIG. 10 is a diagram illustrating how a communication in a video conference is established according to the present embodiment of the present disclosure. As described above, the information processing system 100 includes the plurality of communication terminals 130a to 130d, the relay device 122, and the communication management system 124. Each one of the plurality of communication terminal transmits 130a to 130d transmits or receives image data and audio data that are an example of content data. An image represented by the image data may be a video image or a still image. Alternatively, the image represented by the image data may include both of the video image and the still image.

A communication terminal as a request source that requests start of screen sharing in the video conference is referred to as a request source terminal 111. A communication terminal as a destination (relay destination) which is a request destination for screen sharing is referred to as a destination terminal 112. The plurality of communication terminals 130a to 130d may be used for a communication established between different offices or different rooms in the same office. In addition, the plurality of communication terminals 130a to 130d may be used for a communication established in the same room, between outside of a building and inside of the building, or between different locations outside, for example.

The relay device 122 relays the content data between the plurality of communication terminals 130a to 130d. The communication management system 124 centrally manages login authentication of each of the plurality of communication terminals 130a to 130d, a communication status of each of the plurality of communication terminals 130a to 130d, a destination list, and a communication status of the relay device 122. The relay device 122 and the communication management system 124 may be configured by a single computer or a plurality of computers to which divided portions (functions) are arbitrarily allocated.

In the information processing system 100, a management information session sei for transmitting and receiving various types of management information is established between the request source terminal 111 and the destination terminal 112 via the communication management system 124.

Four sessions are established between the request source terminal 111 and the destination terminal 112 via the relay device 122 for transmitting and receiving four pieces of data, I. e., high-resolution image data, medium-resolution image data, low-resolution image data, and audio data. In FIG. 10, the four sessions are collectively illustrated as an image and audio data session sed. The image and audio data session sed does not necessarily to have the four sessions. The number of sessions included in the image and audio data session sed may be a smaller or larger number of sessions than the four.

The low-resolution image data has, for example, 160 pixels in a horizontal direction and 120 pixels in a vertical direction. The low-resolution image data is to represent a base image. The medium-resolution image data has, for example, 320 pixels in the horizontal direction and 240 pixels in the vertical direction. The high-resolution image data has, for example, 640 pixels in the horizontal direction and 480 pixels in the vertical direction. In the case of a narrow band path, low-quality image data that only includes the low-resolution image data, which is serving as a base image, is relayed. In the case of a relatively wide band path, medium quality image data including the low-resolution image data serving as a base image and the medium-resolution image data is relayed. In the case of a very wide band path, high-quality image data including low-resolution image data serving as a base image, intermediate-resolution image data, and high-resolution image data is relayed. The audio data that has a data size smaller than the image data is relayed even in the case of the narrow band path.

Figure 11:
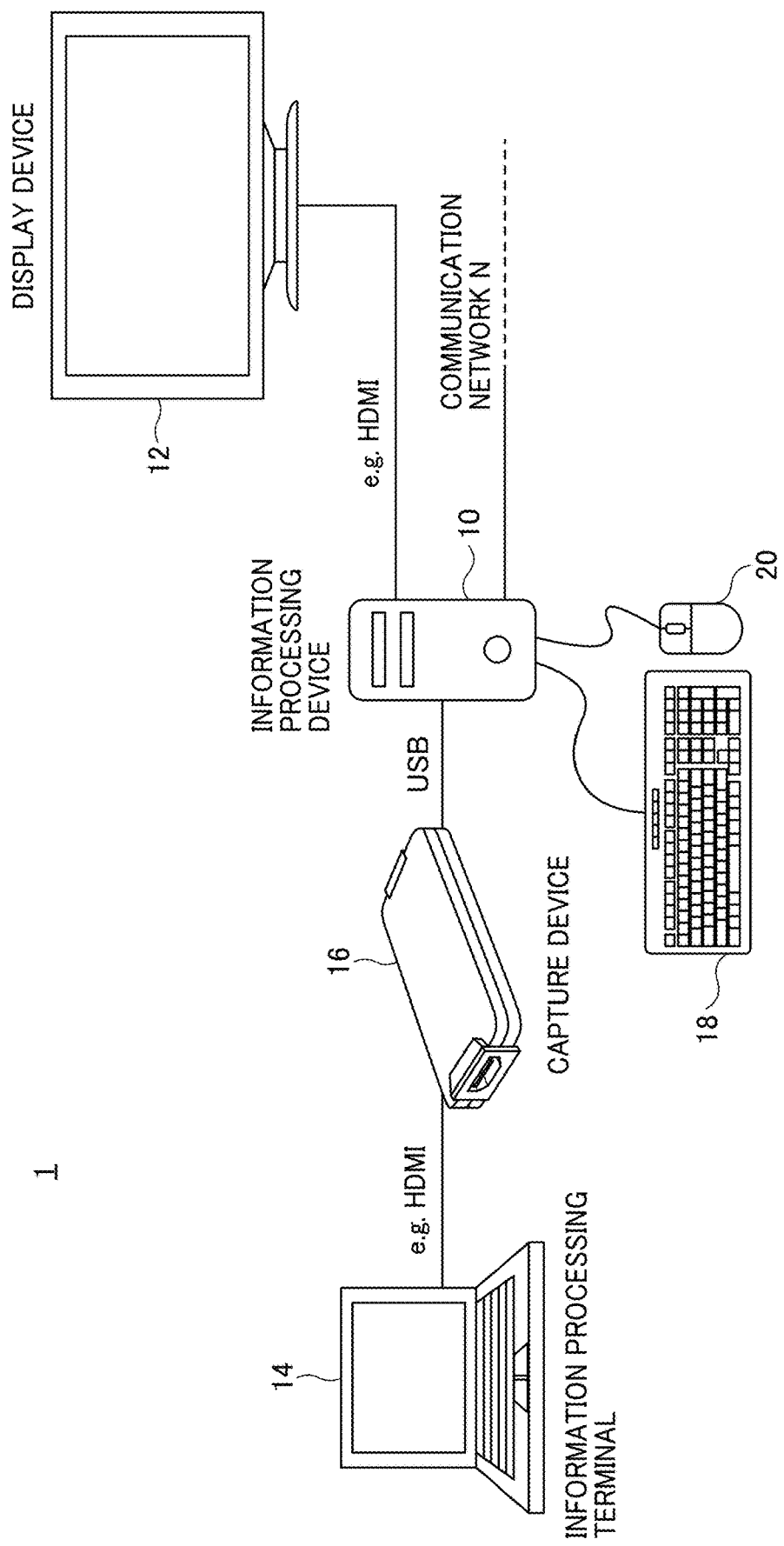
FIG. 11 is a schematic diagram illustrating a configuration of an information processing system at one of a plurality of locations (bases), according to one or more embodiments of the present disclosure.

FIG. 11 is a schematic diagram illustrating a configuration of an information processing system at one of the plurality of locations according to the present embodiment. In FIG. 11, the information processing system 1 including the information processing device at the location A is illustrated. In the information processing system 1 illustrated in FIG. 11, the information processing system 1 illustrated in FIG. 1 is connected to a communication network N such as the communication network N1 or N2.

Figure 12:
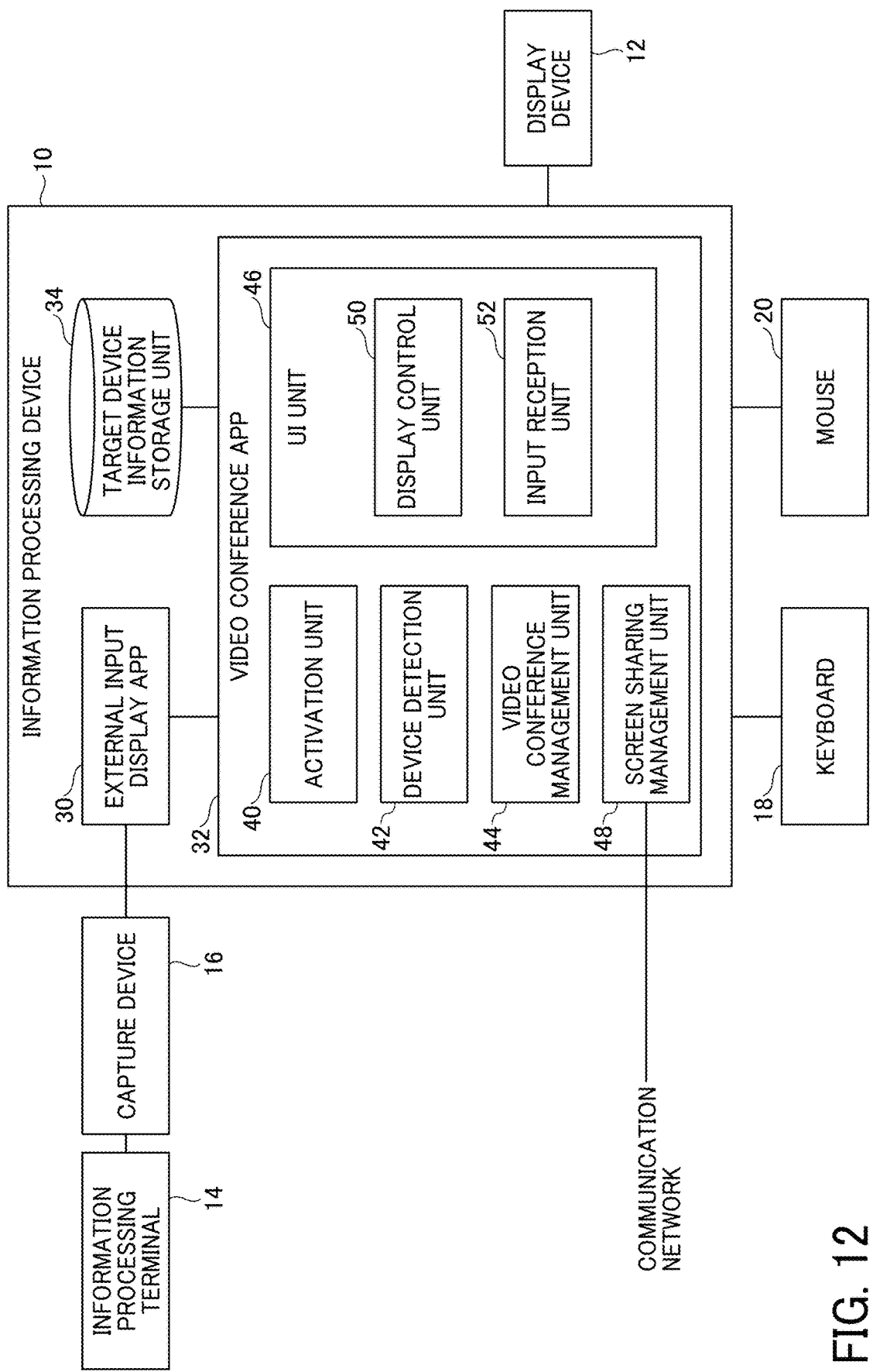
FIG. 12 is a block diagram illustrating an example of a functional configuration of an information processing device at one of a plurality of locations, according to one or more embodiments of the present disclosure.

FIG. 12 is a block diagram illustrating an example of a functional configuration of an information processing device at one of the plurality of locations according to the present embodiment. The information processing device 10 illustrated in FIG. 12 has a configuration in which a screen sharing management unit 48 is added to the configuration of the information processing system 1 illustrated in FIG. 3. The screen sharing management unit 48 manages screen sharing performed with the communication terminals 130b to 130d connected via the communication network N.

For example, the screen sharing management unit 48 requests the communication terminals 130b to 130d to start screen sharing to share a screen from the activated external input display application 30, thereby enabling screen sharing among the plurality of locations. In response to receiving a screen sharing start request from any one of the communication terminals 130b to 130d after the screen sharing to share the screen from the external input display application 30 is started, the screen sharing management unit 48 ends the screen sharing currently performed to share the screen from the external input display application 30 and newly starts screen sharing according to a new request.

Figure 13:
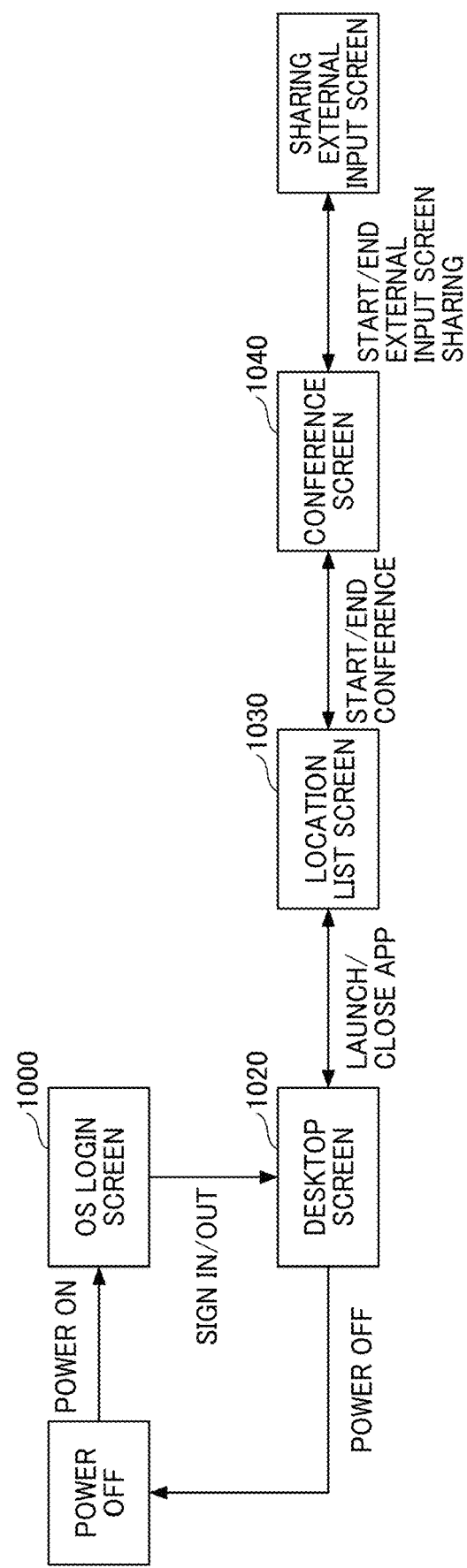
FIG. 13 is a schematic diagram illustrating an example of screen transition of an information processing device at one of a plurality of locations, according to one or more embodiments of the present disclosure.

FIG. 13 is a schematic diagram illustrating an example of screen transition of an information processing device at one of the plurality of locations according to the present embodiment. A screen displayed on the display device 12 by the information processing device 10 transitions as illustrated in FIG. 13, for example. The information processing device 10 displays a login screen 1000 of an operating system (OS) on the display device 12 when the power is turned on. The information processing device 10 displays a desktop screen 1020 on the display device 12 by sign-in performed by the user.

The information processing device 10 displays, for example, a location list screen 1030 on the display device 12 when the user launches the video conference application 32. The information processing device 10 displays, for example, a conference screen 1040 as illustrated in FIG. 5 on the display device 12 in response to a user operation of selecting one or more locations to perform the video conference and of requesting start of the video conference and then starts the video conference between the plurality of locations.

In response to a user operation performed by the user who operates (uses) the information processing device 10 of pressing the screen sharing button 1042 after the video conference starts, a screen sharing target list is displayed on the conference screen 1040. In response to a user operation of selecting the external PC input 1044 among from the screen sharing target list, start of screen sharing of external input screen is requested. A request for start of screen sharing of external input screen may be referred to as an external input screen sharing start request, or a screen sharing request. This allows the user to share a screen of output image of the information processing terminal 14 with the other users attending the video conference from the other locations. The user operation of selecting the external PC input 1044 among from the screen sharing target list is an example of a selection operation of switching a screen displaying on the display device 12 to the output image of the information processing terminal 14. The screen displayed on the display device 12 before the switching to the output image of the information processing terminal 14 may be, for example, a screen of an application (installed application) installed on the information processing device 10.

In response to the external input screen sharing request, the information processing device 10 activates the external input display application 30, displays the output image of the information processing terminal 14 on the display device 12, and starts screen sharing (starts sharing a screen) of sharing the output image of the information processing terminal 14 among the plurality of locations. In addition, in case of detecting the capture device 16, the information processing device 10 activates the external input display application 30, displays the output image of the information processing terminal 14 on the display device 12, and starts screen sharing of sharing the output image of the information processing terminal 14 among the plurality of locations.

In addition, in response to receiving a screen sharing start request from one of the other locations, the information processing device 10 ends the screen sharing of sharing the output image of the information processing terminal 14 and starts screen sharing according to the request received from the one of the other locations.

Figure 14:
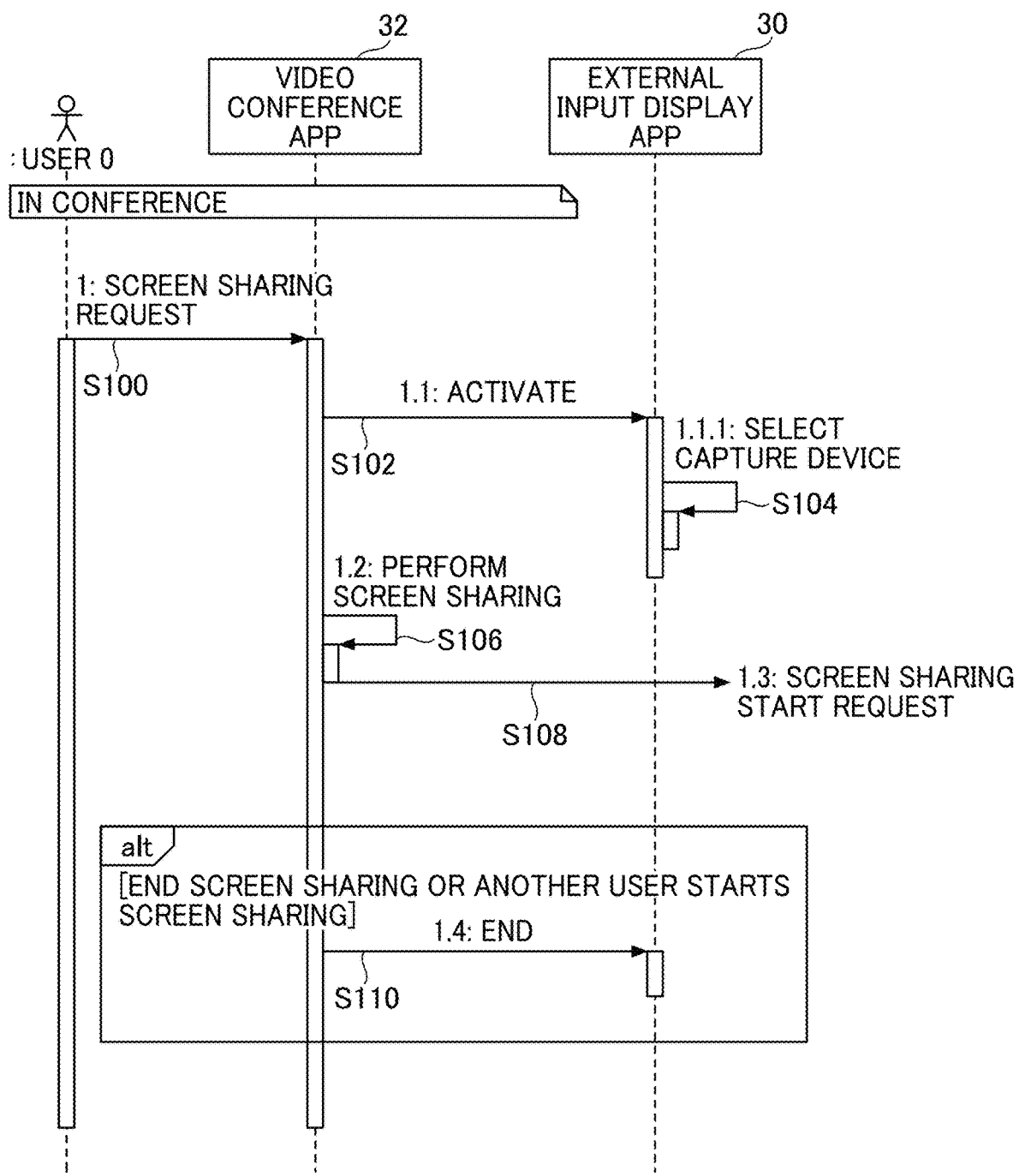
FIG. 14 is a sequence diagram illustrating an example of a process performed by an information processing device at one of a plurality of locations in an information processing system in which screen sharing is performed, according to one or more embodiments of the present disclosure.

FIG. 14 is a sequence diagram illustrating an example of a process performed by an information processing device at one of the plurality of locations in the information processing system in which screen sharing is performed according to the present embodiment. Since the sequence diagram illustrated in FIG. 4 is substantially the same as the process of the sequence diagram illustrated in FIG. 6 except for a part thereof, the description thereof is appropriately omitted.

The processing of steps S100 to S104 of FIG. 14 is substantially the same as the processing of steps S10 to S14 of FIG. 6. In step S106, after confirming that the external input display application 30 is activated, the display control unit 50 of the video conference application 32 causes the display device 12 to display the output image of the information processing terminal 14, thereby starting screen sharing. Further, in step S108, the screen sharing management unit 48 requests the communication terminals 130b to 130d participating in the video conference from the other locations to start the screen sharing, thereby the screen sharing of the output image of the information processing terminal 14 is performable.

In response to receiving a request for end of the external input screen sharing according to a user operation or a request for start of screen sharing from one of the other locations, the activation unit 40 of the video conference application 32 ends the external input display application 30 in step S110.

Figure 15:
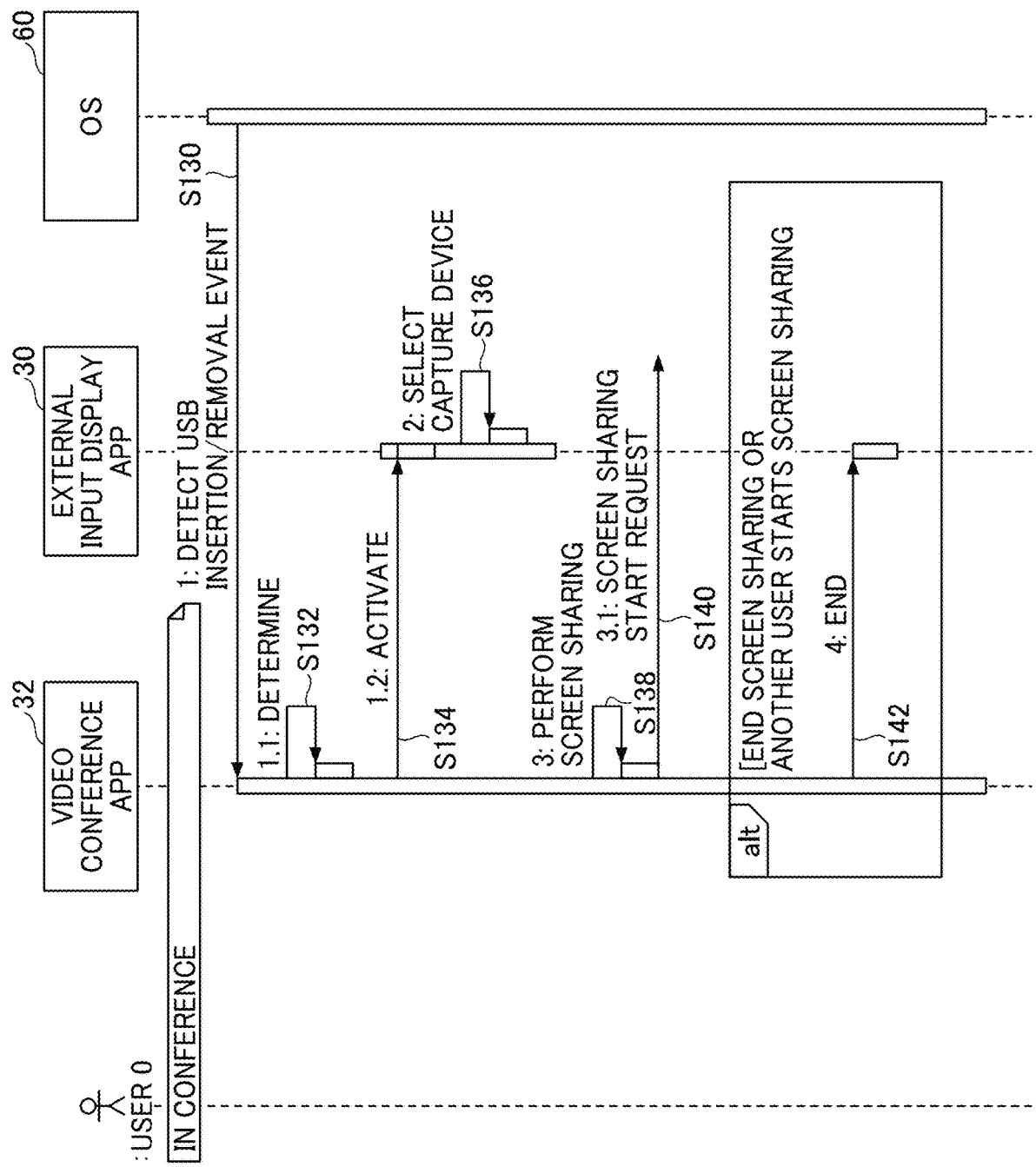
FIG. 15 is a sequence diagram illustrating an example of a process performed by an information processing device at one of a plurality of locations in an information processing system in which screen sharing is performed, according to one or more embodiments of the present disclosure.

FIG. 15 is a sequence diagram illustrating an example of a process performed by an information processing device at one of the plurality of locations in the information processing system in which screen sharing is performed according to the present embodiment. Since the sequence diagram illustrated in FIG. 15 is substantially the same as the process of the sequence diagram illustrated in FIG. 7 except for a part thereof, the description thereof is appropriately omitted.

The processing of steps S130 to S136 of FIG. 15 is substantially the same as the processing of steps S30 to S36 of FIG. 7. In step S138, after confirming that the external input display application 30 is activated, the display control unit 50 of the video conference application 32 causes the display device 12 to display the output image of the information processing terminal 14, thereby starting screen sharing. Further, in step S140, the screen sharing management unit 48 requests the communication terminals 130b to 130d participating in the video conference from the other locations to start the screen sharing, thereby the screen sharing of the output image of the information processing terminal 14 is performable. In step S130, the OS 60 of the information processing device 10 notifies the device detection unit 42 of the video conference application 32 of a USB insertion/removal event indicating that a USB has been inserted, however, this is not limiting the disclosure. However, there is a case in which the capture device 16 is connected to the information processing terminal 14 in advance, and in such a case, the OS 60 of the information processing device 10 notifies the device detection unit 42 of the video conference application 32 of a connection/disconnection event of the information processing terminal 14. In this case, at a stage where the capture device 16 is connected to the information processing device 10, step S136 in which the capture device 16, which is a screen sharing target, is selected is performed. After that, the information processing terminal 14 is connected to the capture device 16 via an HDMI or the like. When detecting a HDMI connection (video input) from the information processing terminal 14, the capture device 16 notifies the device detection unit 42 of the video conference application 32 of the detection. When the notification is received, in step S138, screen sharing is started by causing the display device 12 to display the output image of the information processing terminal 14 and transmitting the output image of the information processing terminal 14 to the other communication terminals 130b to 130d each of which is one of the other locations.

In response to receiving a request for end of the external input screen sharing according to a user operation or a request for start of screen sharing from one of the other locations, the activation unit 40 of the video conference application 32 ends the external input display application 30 in step S142.

Figure 16:
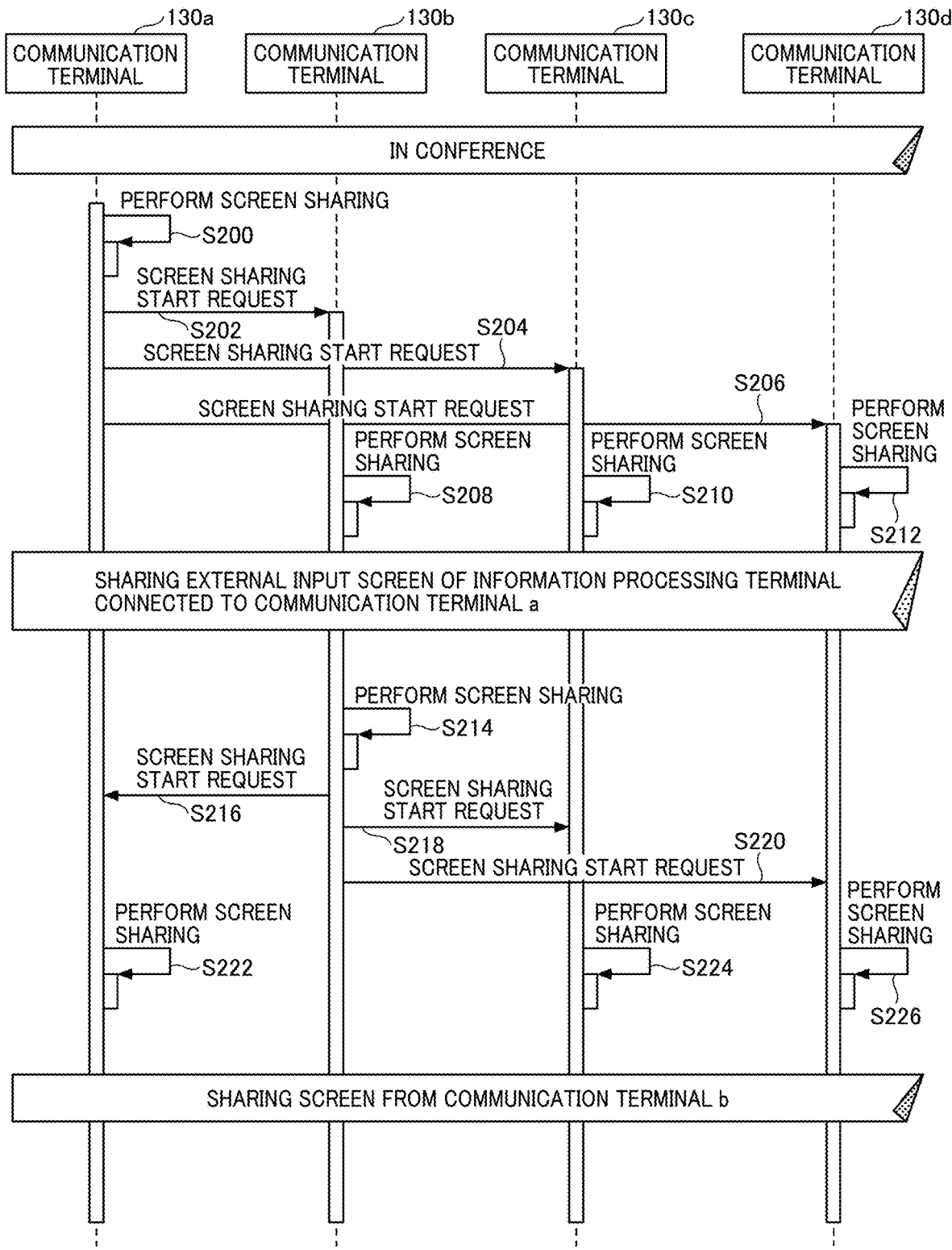
FIG. 16 is a sequence diagram illustrating an example of a screen sharing process in an information processing system including a plurality of locations, according to one or more embodiments of the present disclosure.

FIG. 16 is a sequence diagram illustrating an example of a screen sharing process in the information processing system including a plurality of bases (locations) according to the present embodiment. The communication terminals 130a to 130d in FIG. 16 are participating in the same video conference.

In step S200, after confirming the activation of the external input display application 30, the communication terminal 130a starts screen sharing by causing the display device 12 to display the output image of the information processing terminal 14. In steps S202 to S206, the communication terminal 130a requests the other communication terminals 130b to 130d participating in the same video conference to start screen sharing of sharing the output image of the information processing terminal 14. The communication terminals 130b to 130d that have received the screen sharing start request from the communication terminal 130a are able to perform screen sharing of sharing the output image of the information processing terminal 14 in steps S208 to S212. Accordingly, the plurality of communication terminals 130a to 130d participating in the same video conference enters a status of sharing the screen of the output image of the information processing terminal 14, which is connected to the communication terminal 130a.

In step S214, the user who operates (uses) the communication terminal 130b performs a selection operation for screen sharing. In steps S216 to S220, the communication terminal 130b requests the other communication terminals 130a, 130c, and 130d participating in the same video conference to start screen sharing. The other communication terminals 130b, 130c, and 130d that have received the screen sharing start request from the communication terminal 130b perform screen sharing according to the screen sharing start request from the communication terminal 130b in steps S222 to S226. Accordingly, the communication terminals 130a to 130d participating in the same video conference are sharing a screen in accordance with the screen sharing start request from the communication terminal 130b.

As illustrated in FIG. 16, in the information processing system 1 according to the second embodiment, a screen sharing start request transmitted later is prioritized. Accordingly, in the information processing system 1 according to the second embodiment, the activated external input display application 30, which has been automatically activated, is terminated at a time when another screen sharing start request is transmitted after the previous screen sharing is started. In addition, according to the present embodiment, it is possible to implement a mechanism in which an information processing terminal (information processing terminal 14) operated (used) by a user is connected to a shared terminal (information processing device 10) placed in a conference room, and a screen of the information processing terminal is displayed on other information processing terminal, or devices display placed at one of the other locations, or an external display, thereby sharing the screen. According to the present embodiment, time and effort for sharing the screen of the information processing terminal 14 connected to the information processing device 10 are reduced.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

In a conventional technology, an information processing terminal operated (used) by a user is not able to perform screen sharing of an output image of the information processing terminal by being connected to a shared terminal (information processing device) placed in a conference room.

An object of one or more embodiments of the present disclosure is to provide an information processing device that allows a user to reduce the time and the effort taken for performing screen sharing in relation to an information processing terminal connected to the information processing device.

According to one or more embodiments, the time and the effort taken for sharing a screen of an information processing terminal connected to an information processing device are reduced.

According to one or more embodiments of the present disclosure, an information processing system including one or more information processing devices is provided. Each of the one or more information processing devices includes circuitry to detect one of a device and an information processing terminal. The device is connected to the information processing terminal and used to receive an output image of the information processing terminal. The information processing terminal is connected to the information processing device via the device. The circuitry further causes a display device connected to the information processing device to display the output image of the information processing terminal according to a detection of the one of the device and the information processing terminal. The circuitry further manages screen sharing performed to share the output image of the information processing terminal with the other one or more information processing devices connected via a network.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. An information processing device, comprising circuitry configured to
   detect one of a device and an information processing terminal, the device being connected to the information processing terminal and used to receive an output image of the information processing terminal, the information processing terminal being connected to the information processing device via the device;
   activate an external input display application to display, on a display device connected to the information processing device, the output image of the information processing terminal, in response to one of a detection and a selection operation, the detection of the device used to receive the output image, and the selection operation being a user operation for the display device to display the output image; and
   display, on the display device, a screen of the external input display application.

2. The information processing device of claim 1, wherein the circuitry is further configured to display, on the display device, the output image according to the selection operation.

3. The information processing device of claim 1, wherein the circuitry is further configured to receive the selection operation, the selection operation being a user operation for switching a screen being displayed on the display device to the output image of the information processing terminal.

4. The information processing device of claim 1, wherein the circuitry is further configured to display, on the display device, the screen by switching between a first screen and a second screen, the first screen being a screen from an installed application and the second screen being the output image of the information processing terminal.

5. The information processing device of claim 1, wherein the circuitry is further configured to
   detect a connection of the device; and
   activate the external input display application in response to the detection of the connection of the device.

6. The information processing device of claim 5, wherein the circuitry is further configured to refer to a memory that stores target device information indicating that the device is a target device for screen sharing to detect the connection of the device.

7. The information processing device of claim 1, wherein the circuitry is further configured to
   manage screen sharing performed to share a screen with one or more other information processing devices connected via a network; and
   transmit, to the one or more other information processing devices, a request for start of screen sharing to share, with the one or more other information processing devices, the output image displayed on the display device.

8. The information processing device of claim 7, wherein the circuitry is further configured to end display on the display device of the output image in response to receiving, from one of the one or more other information processing devices, the request for start of screen sharing.

9. A non-transitory recording medium storing computer executable instructions which, when executed by one or more processors of an information processing device, cause the processors to:
   detect one of a device and an information processing terminal, the device being connected to the information processing terminal and used to receive an output image of the information processing terminal, the information processing terminal being connected to the information processing device via the device;
   activate an external input display application to display, on a display device connected to the information processing device, the output image of the information processing terminal, in response to one of a detection and a selection operation, the detection of the device used to receive the output image, and the selection operation being a user operation for the display device to display the output image; and
   display, on the display device, a screen of the external input display application.

10. An information processing system, comprising:
    an information processing device; and
    a display device connected to the information processing device, wherein
    the information processing device includes circuitry configured to
      detect one of a device and an information processing terminal, the device being connected to the information processing terminal and used to receive an output image of the information processing terminal, the information processing terminal being connected to the information processing device via the device,
      activate an external input display application to display, on the display device, the output image of the information processing terminal, in response to one of a detection and a selection operation, the detection of the device used to receive the output image, and the selection operation being a user operation for the display device to display the output image; and
      display, on the display device, a screen of the external input display application.

11. An information processing method, comprising:
    detecting, by an information processing device, one of a device and an information processing terminal, the device being connected to the information processing terminal and used to receive an output image of the information processing terminal, the information processing terminal being connected to the information processing device via the device;
    activating an external input display application to display, on a display device connected to the information processing device, the output image of the information processing terminal, in response to one of a detection and a selection operation, the detection of the device used to receive the output image, and the selection operation being a user operation for the display device to display the output image; and
    displaying, on the display device, a screen of the external input display application.

12. The information processing method of claim 11, wherein the output image is displayed according to the selection operation.

13. The information processing method of claim 11, further comprising receiving the selection operation, the selection operation being a user operation for switching a screen being displayed on the display device to the output image of the information processing terminal.

14. The information processing method of claim 11, further comprising displaying, on the display device, the screen by switching between a first screen and a second screen, the first screen being a screen from an installed application and the second screen being the output image of the information processing terminal.

15. The information processing method of claim 11, further comprising:
   detecting a connection of the device; and
   activating the external input display application in response to the detection of the connection of the device.

16. The information processing method of claim 15, further comprising referring to a memory that stores target device information indicating that the device is a target device for screen sharing to detect the connection of the device.

17. The information processing method of claim 11, further comprising:
   managing screen sharing performed to share a screen with one or more other information processing devices connected via a network; and
   transmitting, to the one or more other information processing devices, a request for start of screen sharing to share, with the one or more other information processing devices, the output image displayed on the display device.

18. The information processing method of claim 17, further comprising ending display on the display device of the output image in response to receiving, from one of the one or more other information processing devices, the request for start of screen sharing.

* * * * *